July 24, 1951  J. ARDITO  2,561,721
DEVICE FOR DISPENSING MEASURED QUANTITIES
OF GRANULAR MATERIALS
Filed Nov. 14, 1947
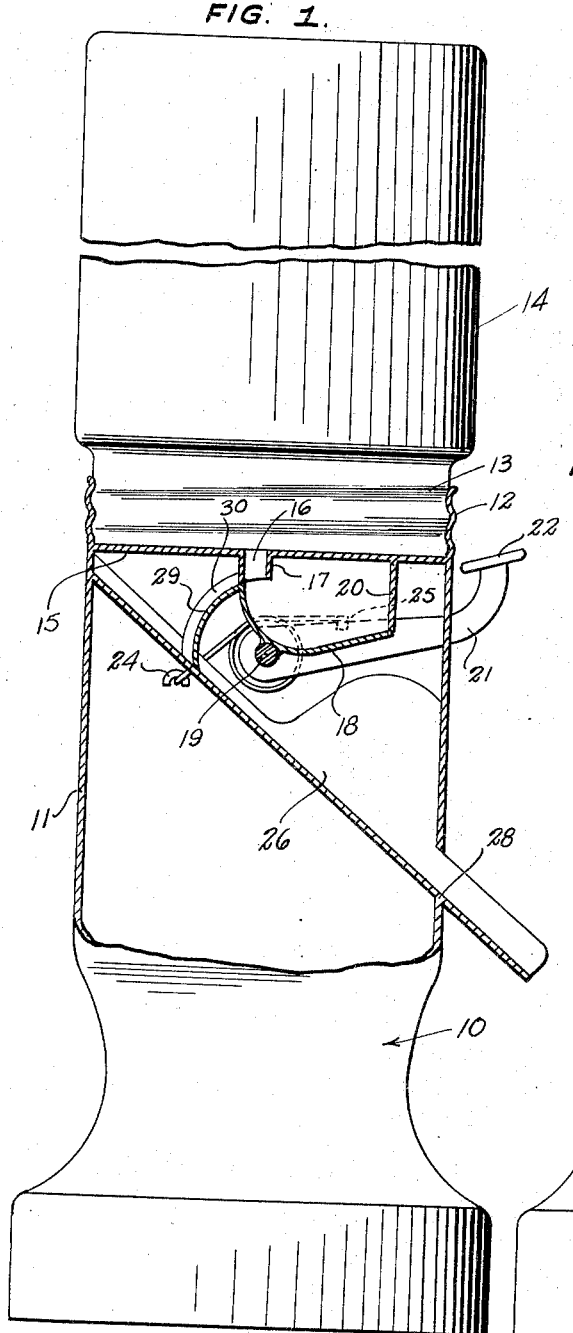
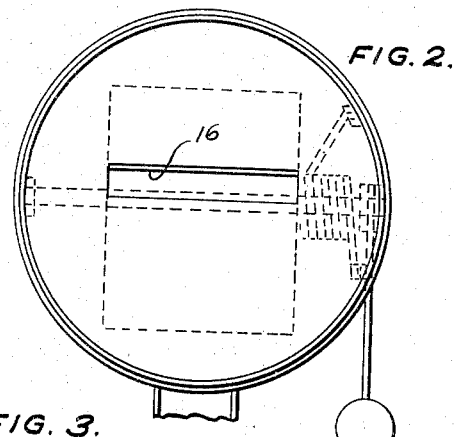
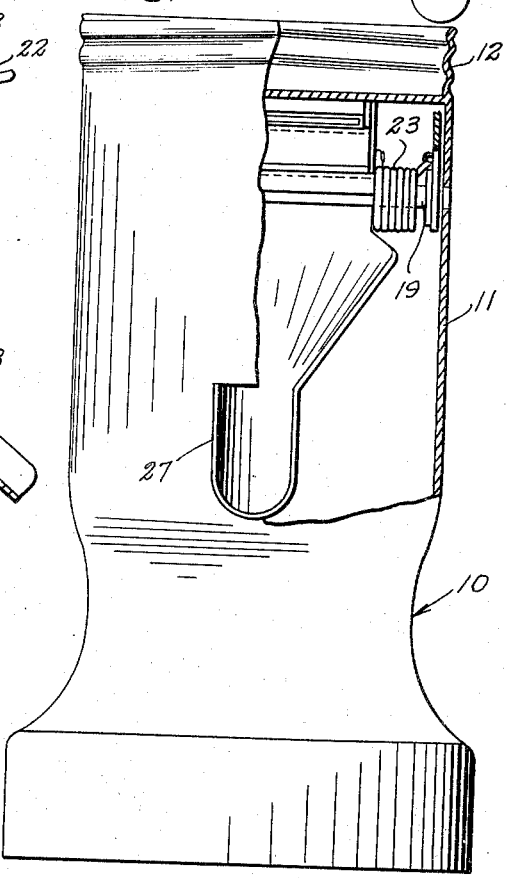
INVENTOR.
JAMES ARDITO,
BY
McMorrow, Berman & Davidson
ATTORNEYS.

Patented July 24, 1951

2,561,721

UNITED STATES PATENT OFFICE 2,561,721

DEVICE FOR DISPENSING MEASURED QUANTITIES OF GRANULAR MATERIALS

James Ardito, Dunmore, Pa.

Application November 14, 1947, Serial No. 786,079

2 Claims. (Cl. 222—339)

This invention relates to measuring dispensing devices for dispensing predetermined quantities of granular material such as sugar or the like.

An object of this invention is to provide a dispenser embodying a rockable dispensing cup disposed beneath a reservoir or supply, which upon downward rocking thereof, is adapted to discharge a measured quantity of granular material, and is to cut off the delivery of material until the measuring member has been returned to its receiving position.

Another object of this invention is to provide a dispensing device of this kind which is constructed in the form of a base having a rockable dispensing element in the base with the upper end of the base formed to receive a reservoir or magazine adapted to be threaded onto the upper end of the base.

Another object of this invention is to provide a dispenser of this kind which is simple in construction so that it can be manufactured at a relatively small cost and will not readily get out of order.

With the above and other objects in view, my invention consists in the arrangement, combination and details of construction disclosed in the drawings and specification, and then more particularly pointed out in the appended claims.

In the drawings,

Figure 1 is a detailed side elevation partly broken away and in vertical section, of a dispenser constructed according to an embodiment of this invention, Figure 2 is a plan view of the base portion of the device, Figure 3 is a detailed front elevational view partly broken away and in section of the base portion of the device.

Referring to the drawings, the numeral 10 designates generally a hollow base member which is formed of an upstanding cylindrical side wall 11.

The side wall 11 is formed at its upper end with a threaded neck 12 in which the threaded neck 13 of a reservoir 14 is adapted to engage. The reservoir 14 is inverted so that the upper end thereof is lowermost in order that the granular material in the reservoir or magazine 14 will flow downwardly. An upper horizontal wall 15 is fixed across the upper end portion of the side wall 11, being disposed at the lower end of the threaded neck 12 so that the threaded neck 13 of the reservoir or magazine 14 will engage the upper side of the wall 15.

The wall 15 is formed with an elongated discharge opening 16 and a discharge duct or spout 17 extends downwardly from the wall 15. A delivery cup 18 is disposed below the wall 15 being fixed to a shaft 19 which is journalled across the cylindrical wall 11.

The delivery member or cup 18 is of transversely arcuate configuration and when in receiving position is adapted at one end thereof to engage an adjacent wall of the delivery spout 17. The other end of the cup or delivery member 18 is adapted to engage a depending wall or baffle 20 which is fixedly carried by the top wall 15.

The shaft 19 has fixed thereto an elongated handle or lever 21 which projects through the wall 11 and is provided with an operating knob 22. A coil spring 23 is disposed about the shaft 19 being fixed at one end to a stationary eye or loop 24 carried by the inside of the upright wall 11 and the other end of the coil spring 23 is fixed as at 25 to the upper edge portion of the lever or handle 21.

The housing or upright standard 11 has mounted therein a chute 26 which inclines downwardly and outwardly and is provided with a spout 27 which projects through an opening 28 formed in the standard or cylindrical wall 11.

In order to provide for a cutoff of the granular material when the cup 18 is rocked downwardly to discharge the material engaged therein, I have provided an arcuate cutoff plate 29 which is fixed to and extends rearwardly from the cup or delivery member 18.

The cutoff member 29 is formed with end flanges 30 which engage at the ends of the delivery spout 17 during the downward rocking of the delivery member 18.

In the use and operation of this device, the granular material such as sugar or the like is disposed in the magazine or reservoir 14 which is inverted and threaded into the threaded neck 12 of the base 10.

The granular material will flow through the opening 16 and the spout 17 into the normally closed cup 18. When it is desired to dispense the material in the cup 18, handle or lever 21 is rocked downwardly against the tension of spring 23 so that the material in the cup 18 will be discharged into the delivery chute 26 and will move downwardly along the chute 26 and flow through the spout 27 into a receiving vessel disposed below the spout 27.

As the lever 21 is rocked downwardly, arcuate cutoff member 29 will be swung to a cutoff position across the open end of the discharge nipple 17 so that no material will be discharged from this spout 17 when the delivery cup 18 is in its delivering position.

I do not mean to confine myself to the exact details of construction herein disclosed, but claim all variations falling within the purview of the appended claims.

Having thus described my invention, what I claim is:

1. A measuring dispenser comprising a hollow housing having an open upper end, a hopper detachably mounted on the upper end in communication with the housing, a transverse partition in said housing below the upper end thereof, said partition having a vertical opening, a spout depending from the partition in alignment with the opening, a shaft transversely journaled in the housing below the spout, a cup-shaped delivery member fixed transversely on the shaft and having a forward discharge end and an upwardly curved rearward baffle end, a baffle depending from the partition and engaging the discharge end of the delivery member, the baffle end of the delivery member being in normal engagement of one wall of the spout to align the spout with the delivery member so that a portion of the material in the hopper is free to fill the delivery member, said shaft extending exteriorly of the housing and having an operating member fixed thereon whereby the delivery member may be swung about a horizontal axis to discharge the material from the discharge end thereof, spring means associated with the shaft for normally retaining the delivery member in engagement of the baffle and spout, an arcuate cut-off plate extending downwardly from the baffle end of the delivery member and arranged to close off the spout upon discharging movement of the delivery member, and a downwardly inclined trough member in said housing and having one end extending exteriorly thereof, said trough being disposed to receive the contents of the delivery member and discharge the contents from the housing.

2. A measuring dispenser comprising a hollow housing having an open upper end, a hopper detachably mounted on the upper end in communication with the housing, a transverse partition in said housing below the upper end thereof, said partition having a vertical opening, a spout depending from the partition in alignment with the opening, a shaft transversely journaled in the housing below the spout, a cup-shaped delivery member fixed transversely on the shaft and having a forward discharge end and an upwardly curved rearward baffle end, a baffle depending from the partition and engaging the discharge end of the delivery member, the baffle end of the delivery member being in normal engagement of one wall of the spout to align the spout with the delivery member so that a portion of the material in the hopper is free to fill the delivery member, said shaft extending exteriorly of the housing and having an operating member fixed thereon whereby the delivery member may be swung about a horizontal axis to discharge the material from the discharge end thereof, spring means associated with the shaft for normally retaining the delivery member in engagement of the baffle and spout, an arcuate cut-off plate extending downwardly from the baffle end of the delivery member and arranged to close off the spout upon discharging movement of the delivery member, and a downwardly inclined trough member in said housing and having one end extending exteriorly thereof, said trough being disposed to receive the contents of the delivery member and discharge the contents from the housing, the lower end of said spout being curved to conform to the curvature of the cut-off plate which slidably engages in flush abutment with said end.

JAMES ARDITO.

REFERENCES CITED

The following references are of record in the file of this patent:

UNITED STATES PATENTS

| Number | Name | Date |
|---|---|---|
| 791,990 | Randall | June 6, 1905 |
| 950,286 | Hauty | Feb. 22, 1910 |
| 1,513,373 | Corporon | Oct. 28, 1924 |
| 1,996,044 | Green | Mar. 26, 1935 |
| 2,157,282 | De Javannes | May 9, 1939 |
| 2,165,933 | Martin | July 11, 1939 |